Feb. 4, 1958     C. A. SMITH     2,821,804
DEVICE FOR USE IN CATCHING FISH
Filed May 2, 1956
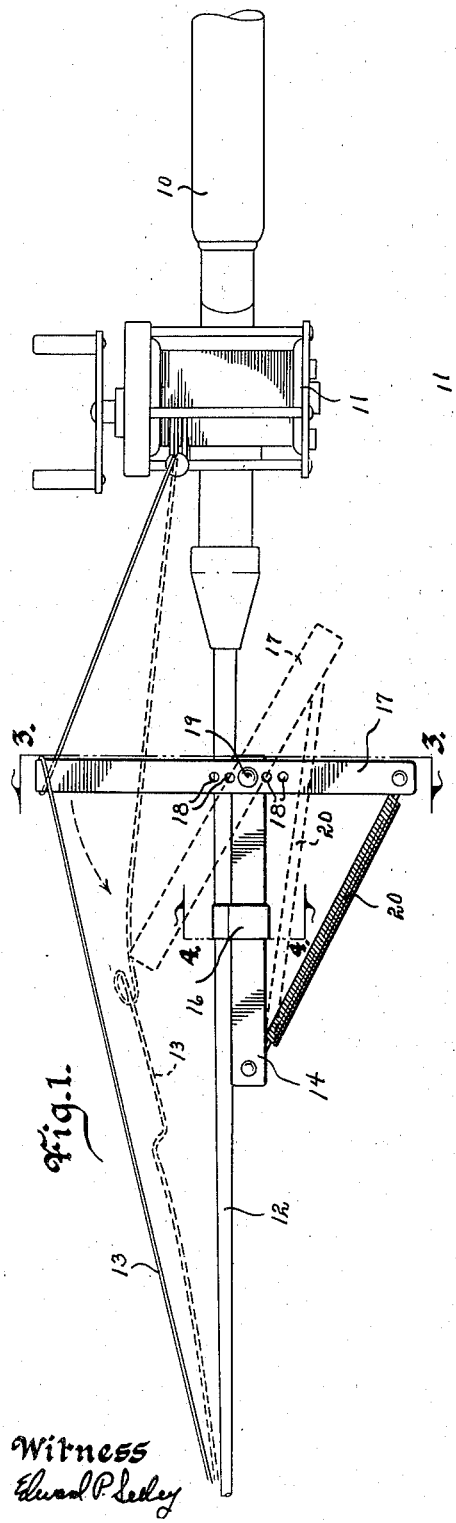
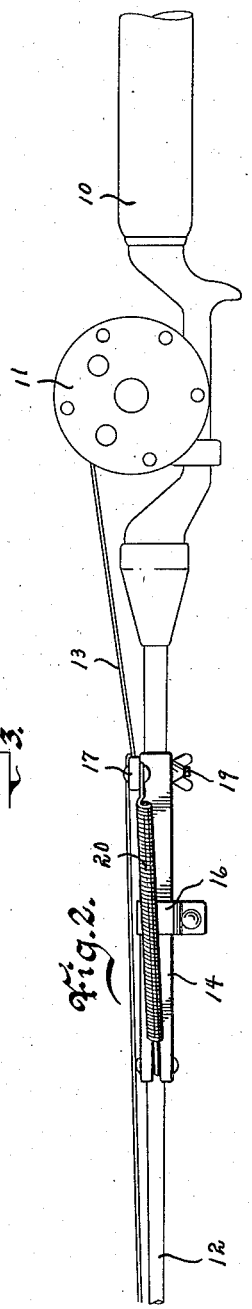
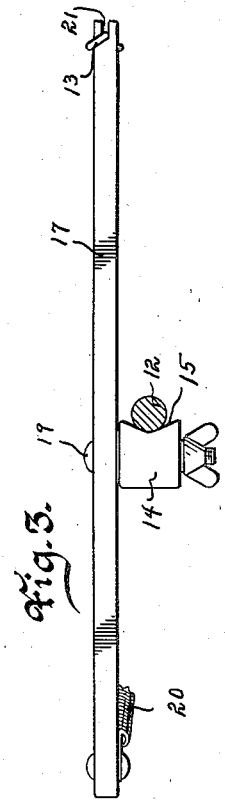
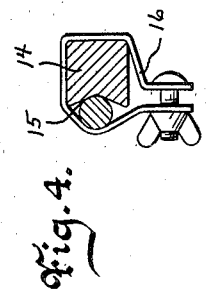
Inventor
Clive A. Smith
by M. Talbert Dick
Attorney
Witness
Edward P. Seeley

United States Patent Office 2,821,804
Patented Feb. 4, 1958

2,821,804

DEVICE FOR USE IN CATCHING FISH

Clive A. Smith, Des Moines, Iowa

Application May 2, 1956, Serial No. 582,296

7 Claims. (Cl. 43—15)

This invention relates to fishing tackle and more particularly to a yieldable fish line controlling device.

Fishing aids are many and varied. Most relate to hooks, artificial baits, poles or rods, and fish line reels. While all such equipment is desirable it does not adequately provide the proper line control for successfully catching fish. Most reels do have drag adjustment, but there is no automatic yieldable back pressure on the line at the time the fish contacts and runs with the bait or lure. The absence of this yieldable back force is the reason many fish are lost.

Therefore, one of the principal objects of my invention is to provide a line control device that will yieldingly automatically tend to return the line to its original position as it is moved by the action of the fish.

More specifically the object of this invention is to provide a spring means attachable to the fish line so that any extension of the line from the reel will be under increasing spring tension.

A further object of my invention is to provide a means for releasing the line from its yieldable resistance means after a predetermined line pull.

A still further object of this invention is to provide a means for adjusting the spring tension of a line control arm.

Still further objects of my invention are to provide a fish line control means that is economical in manufacture, durable in use, and refined in appearance. These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a top view of my device installed and with broken lines illustrating its action, Fig. 2 is a side view of my item on a casting rod, Fig. 3 is an enlarged view of the device taken from line 3—3 of Fig. 1, and Fig. 4 is a cross sectional view of the device taken on line 4—4 of Fig. 1 and more fully illustrates its construction.

My device may be used on any suitable base frame and without the employment of a casting rod or pole. When such is the case it is ideal for boat or bank fishing. However, most fishermen will prefer that my invention be used on a casting rod or pole and therefore my drawings and description will be confined to a structure particularly adapted to a rod or pole shaft.

In the drawings I show an ordinary casting rod having the handle portion 10, reel 11, and shaft 12. The numeral 13 designates the fish line wound upon the reel and extending forwardly along the longitudinal length of the shaft and through its usual guide eyes. It is upon such equipment that I install my device and which I will now describe in detail.

The numeral 14 designates an elongated base having a groove 15 conforming to the curvature of the pole shaft 12. The numeral 16 designates a clamp means for detachably securing the base rigidly to the shaft. The numeral 17 designates a lever arm. This arm has a plurality of bearing holes 18 in its length. The numeral 19 designates a screw, bolt means or like selectively extending through a bearing hole 18 and to the base 14 as shown in Fig. 1. The numeral 20 designates a coil spring having one end secured to the left end of the arm 17 and extending forwardly and inwardly to be secured at its other end to the base 14. The right end portion of the arm 17 extends normally transversely across the fishing pole shaft. Any forward pull on the right end of this arm 17 will be against the action of the coil spring and this spring force will be progressively stronger as the right end of the arm swings forwardly. The numeral 21 designates a horizontal cut or groove in the right end of the arm 17. The force resistance of the spring may be increased or decreased as desired by changing the fulcrum pivot of the arm. This is accomplished by selecting the proper hole 18 for the securing axle means 19.

The practical operation of the device is as follows: With the line out for fish catching purposes, the line is placed to extend through the slot or slit 21 and through which it may move in either direction without material resistance. Thus, at this position the fishing equipment will function in a normal manner. However, to place my device into operation the line is given a back half hitch around the right end portion of the arm 17, as shown in Fig. 2. This action detachably secures the line to the right end of the arm. Any forward pull on the free end of the line by a fish will be against the resistance of the spring 20. It is this yieldable back pull that sets the hook and catches the fish. If the forward movement and pull on the fish line continues, the right end of the arm 17 will continue to swing forwardly and inwardly eventually permitting the half hitch of the line to slip off of and free of the right end of the arm 17. At this moment the line will run free as permitted or affected by the reel 11.

From the foregoing it will be obvious that my device will automatically exert back adjustable yieldable pull on the fish line and that after the pull has reached a predetermined strength, all yieldable resistance to the forward movement of the line will automatically be released. To loop the line over the free end of the arm only takes a moment. When desired, it may be as easily removed.

Some changes may be made in the construction and arrangement of my device for catching fish without departing from the real spirit and purpose of my invention, and it is my intention to cover by my claims, any modified forms of structure or use of mechanical equivalents which may be reasonably included within their scope.

I claim:

1. In combination, a reel, a base member, a fish line on and extending from said reel, an arm pivoted between its two ends to said base member, a spring means having one end secured to one end of said arm and its other end secured to said base member, and a means for detachably connecting said fish line to the other end of said arm so that a pulling force on said fish line will detach said fish line from said arm after a predetermined displacement of said arm.

2. In combination, a reel, a base member, a fish line on and extending from said reel, an arm pivoted between its two ends to said base member, a spring means having one end secured to one end of said arm and its other end secured to said base member, and a transverse groove in the other end of said arm engaged by said fish line; said fish line adapted to be looped over the end portion of said arm end having said groove.

3. In combination, a reel, a base member, a fish line on and extending from said reel, an arm adjustably pivoted between its two ends to said base member, a spring means having one end secured to one end of said arm and its other end secured to said base member, and a means for detachably connecting said fish line to the other end of said arm so that a pulling force on said fish line will detach said fish line from said arm after a predetermined displacement of said arm.

4. In combination, a rod shaft, a reel mounted on said rod shaft, a fishing line movably supported on the length of said rod shaft and having one of its ends terminate on said reel, an arm operatively pivotally mounted on said rod shaft, a spring means having one end secured to one end of said arm and its other end operatively secured to said rod shaft, said spring means operatively yieldingly holding said arm transverse of said rod shaft, and said fish line secured to said arm.

5. In combination, a rod shaft, a reel mounted on said rod shaft, a fishing line movably supported on the length of said rod shaft and having one of its ends terminate on said reel, an arm operatively pivotally mounted on said rod shaft, a spring means having one end secured to one end of said arm and its other end operatively secured to said rod shaft, said spring means operatively yieldingly holding said arm transverse of said rod shaft, and said fish line detachably secured to said arm so that a pulling force on said fish line will detach said fish line from said arm after a predetermined displacement of said arm.

6. In combination, a rod shaft, a reel mounted on said rod shaft, a fishing line movably supported on the length of said rod shaft and having one of its ends terminate on said reel, an arm operatively pivotally adjustably mounted on said rod shaft, a spring means having one end secured to one end of said arm and its other end operatively secured to said rod shaft, said spring means operatively yieldingly holding said arm transverse of said rod shaft, and said fish line secured to said arm.

7. In combination, a rod shaft, a reel mounted on said rod shaft, a fishing line movably supported on the length of said rod shaft and having one of its ends terminate on said reel, an arm operatively pivotally adjustably mounted on said rod shaft, a spring means having one end secured to one end of said arm and its other end operatively secured to said rod shaft, said spring means operatively yieldingly holding said arm transverse of said rod shaft, and said fish line detachably secured to said arm so that a pulling force on said fish line will detach said fish line from said arm after a predetermined displacement of said arm.

References Cited in the file of this patent

UNITED STATES PATENTS

| | | |
|---|---|---|
| 1,163,193 | Althoff | Dec. 7, 1915 |
| 1,549,405 | Bjurstrom | Aug. 11, 1925 |
| 2,628,443 | Weckerling | Feb. 17, 1953 |
| 2,703,465 | Di Stefano | Mar. 8, 1955 |

FOREIGN PATENTS

| | | |
|---|---|---|
| 681,792 | France | Feb. 4, 1930 |
| 697,684 | France | Nov. 4, 1930 |